US009208596B2

(12) United States Patent
Gibson

(10) Patent No.: US 9,208,596 B2
(45) Date of Patent: Dec. 8, 2015

(54) INTELLIGENT MERGING OF VISUALIZATIONS

(71) Applicant: International Business Machines Corporation, Armonk, NY (US)

(72) Inventor: Stephen D. Gibson, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 14/153,167

(22) Filed: Jan. 13, 2014

(65) Prior Publication Data
US 2015/0199834 A1 Jul. 16, 2015

(51) Int. Cl.
G06K 9/36 (2006.01)
G06T 11/60 (2006.01)
G06K 9/62 (2006.01)
G06T 11/20 (2006.01)
H04N 19/44 (2014.01)

(52) U.S. Cl.
CPC .............. G06T 11/60 (2013.01); G06K 9/6201 (2013.01); G06T 11/206 (2013.01); H04N 19/44 (2013.01)

(58) Field of Classification Search
CPC ............ G06K 9/00134; G06K 9/6201; G06T 11/206; G06T 11/60; H04N 19/44; G06F 3/017; G06F 3/04817; G06F 3/0482; G06F 3/0486; G06F 3/0488; G06F 9/4443; G06F 9/542; G06F 17/30392; G06F 17/30554; G06F 19/325; G06F 19/3406; A61B 3/16; A61B 5/6821; A61B 19/50; A61B 19/52; A61B 19/5225; A61B 2019/5289; A61F 9/00781; A61M 27/002; G06Q 10/10; G06Q 30/02; G12Q 1/6886; G12Q 2600/158
See application file for complete search history.

(56) References Cited

U.S. PATENT DOCUMENTS

| 6,995,768 | B2 | 2/2006 | Jou et al. |
| 8,190,619 | B2 | 5/2012 | Lehtipalo et al. |
| 8,365,079 | B2 | 1/2013 | Kenna et al. |
| 8,656,291 | B2 * | 2/2014 | Chasman et al. ............. 715/763 |
| 8,996,978 | B2 * | 3/2015 | Richstein et al. ............. 715/215 |
| 2008/0288889 | A1 | 11/2008 | Hunt et al. |
| 2011/0283231 | A1 | 11/2011 | Richstein et al. |

(Continued)

FOREIGN PATENT DOCUMENTS

WO 2011071505 A1 6/2011

OTHER PUBLICATIONS

Officetooltips, "Combining Several Charts into one Chart," OfficeToolTips Excel Tip, p. 1-5, OfficeToolTips Team, http://www.officetooltips.com/excel/tips/combining_several_charts_into_one_chart.html, Accessed on Jul. 14, 2015.

(Continued)

Primary Examiner — Jose Couso
(74) Attorney, Agent, or Firm — Patricia B. Feighan; Ryan G. Lewis

(57) ABSTRACT

A processor-implemented method for merging a plurality of visualizations is provided. The method may include receiving the plurality of visualizations. The method may further include analyzing a plurality of elements within the plurality of visualizations. Additionally, the method may include unifying the plurality of elements to generate at least one unified visualization, the at least one unified visualization being based on the analyzing of the plurality of elements. The method may also include producing a single output visualization based on the assembling of the at least one unified visualization.

17 Claims, 4 Drawing Sheets

(56) References Cited

U.S. PATENT DOCUMENTS

2012/0313949 A1    12/2012    Rope et al.
2014/0278364 A1    9/2014    Grosset et al.
2014/0279677 A1    9/2014    Grosset et al.
2014/0325418 A1*    10/2014    Tullis et al. .................. 715/771

OTHER PUBLICATIONS

Originlab Wiki, "Merging and Arranging Graphs," Howto Wiki Tutorial, Last Modified on Jan. 15, 2013, p. 1-8, http://wiki.originlab.com/~originla/howto/index.php?title=Tutorial:Merging_and_Arranging_Graphs, Accessed on Jul. 14, 2015.

* cited by examiner

INTELLIGENT MERGING OF VISUALIZATIONS

FIELD OF THE INVENTION

The present invention relates generally to the field of computing, and more particularly to the merging of visualizations.

BACKGROUND

Consumers may often use multiple visualizations to perform their jobs. The visualizations may come from different sources, such as different systems or different products and may even be in different formats. Consumers may need to consider multiple visualizations together in order to draw an effective conclusion to make a decision. However, it may difficult to comprehend the multiple visualizations all at once. As such, consumers may print multiple visualizations and place the visualizations together on a desk or on a corkboard in order to view and understand what the visualizations mean together. Furthermore, consumers may try to fit multiple visualizations on a single dashboard in order to see them together. However, in addition to this being a potentially difficult and laborious task, only a certain number of visualizations may fit on a dashboard at one time.

Another approach to viewing multiple visualizations at one time may be to work with the system that created the visualizations and author a new visualization that contains all the data so that all the data may be viewed at one time in one visualization. However, this may be very difficult and time consuming. Additionally, this may not always be possible since the visualizations may be provided from different systems and the systems may not have access to data stored in another system. Furthermore, the visualizations may be provided from external sources and the consumer may not have access to the data or the system that is necessary to create the visualization.

SUMMARY

A processor-implemented method for merging a plurality of visualizations is provided. The method may include receiving the plurality of visualizations. The method may further include analyzing a plurality of elements within the plurality of visualizations.

Additionally, the method may include unifying the plurality of elements to generate at least one unified visualization, the at least one unified visualization being based on the analyzing of the plurality of elements. The method may also include producing a single output visualization based on the assembling of the at least one unified visualization.

A computer system for merging a plurality of visualizations is provided. The computer system may include one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method. The method may include receiving the plurality of visualizations. The method may further include analyzing a plurality of elements within the plurality of visualizations. Additionally, the method may include unifying the plurality of elements to generate at least one unified visualization, the at least one unified visualization being based on the analyzing of the plurality of elements. The method may also include producing a single output visualization based on the assembling of the at least one unified visualization.

A computer program product merging a plurality of visualizations is provided. The computer program product may include one or more computer-readable storage devices and program instructions stored on at least one of the one or more tangible storage devices, the program instructions executable by a processor. The computer program product may include program instructions to receive the plurality of visualizations. The computer program product may further include program instructions to analyze a plurality of elements within the plurality of visualizations. Additionally, the computer program product may include program instructions to unify the plurality of elements to generate at least one unified visualization, the at least one unified visualization being based on the analyzing of the plurality of elements. The computer program product may also include program instructions to produce a single output visualization based on the assembling of the at least one unified visualization.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
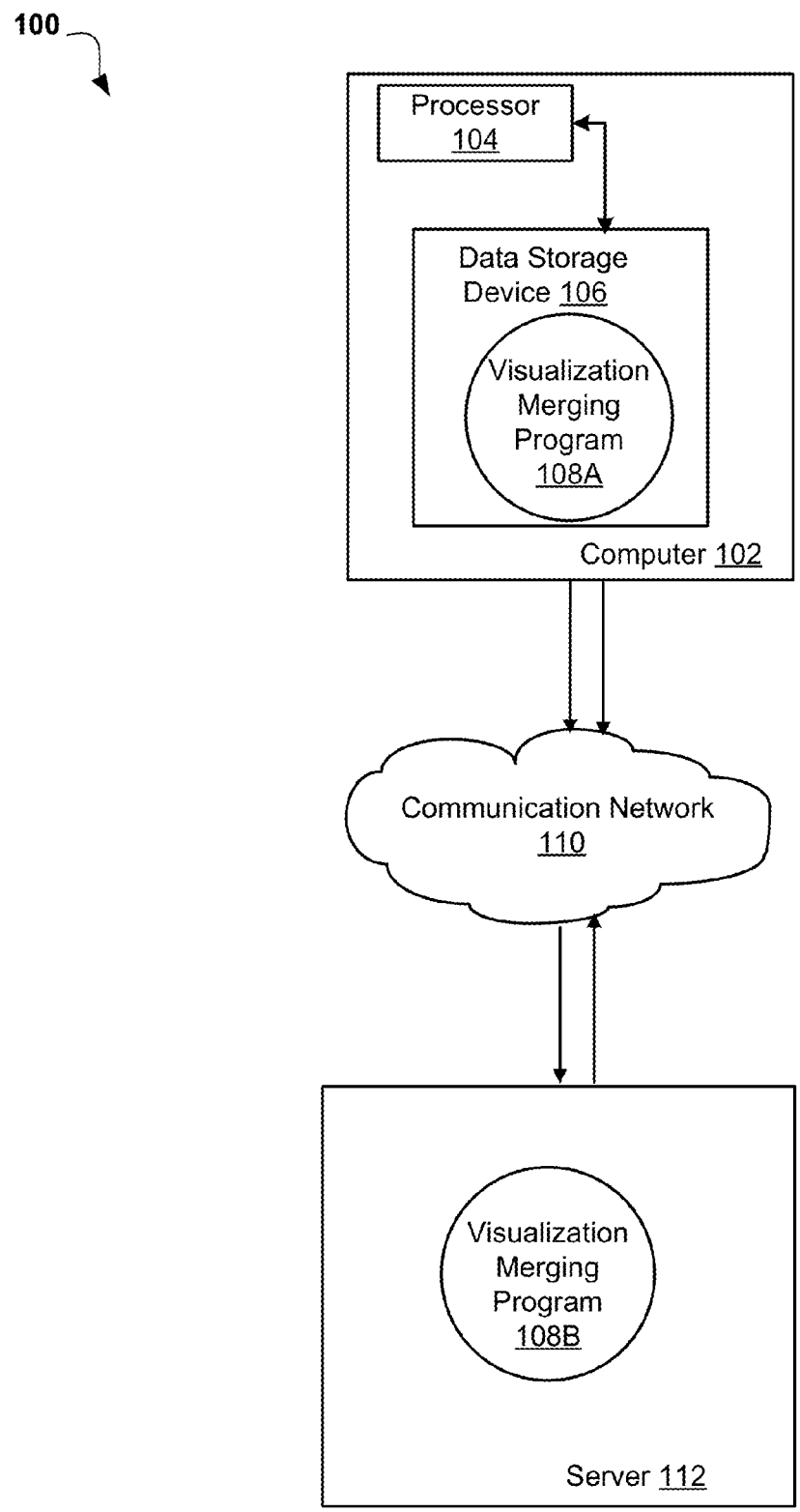
FIG. 1 is a block diagram which illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly to the merging of visualizations. The following described exemplary embodiments may provide a system, method and program product for intelligently merging visualizations.

As previously described, consumers may often use multiple visualizations to perform their jobs. The visualizations may come from different sources, such as different systems or different products and may even be in different formats. Consumers may need to consider multiple visualizations together in order to draw an effective conclusion make a decision.

However, it may difficult to comprehend the multiple visualizations all at once. Current methods for viewing multiple visualizations at once may include printing and placing the visualizations together on a desk or on a corkboard or fitting multiple visualizations on a single dashboard in order to see them together. However, in addition to this being a potentially difficult and laborious task, only a certain number of visualizations may fit on a dashboard at one time. Another approach to viewing multiple visualizations at one time may be to work with the system that created the visualizations and author a new visualization that contains all the data so that all the data may be viewed at one time in one visualization. However, as previously explained, this may be very difficult, time consuming and may not always be possible. The visualizations may be provided from different systems and the systems may not have access to data stored in another system. Furthermore, the visualizations may be provided from external sources and the consumer may not have access to the data or the system that is necessary to create the visualization. As such, it may be advantageous, among other things, to be able to merge arbitrary visualizations into a sensible, single visualization for easy consumption by a consumer.

According to at least one embodiment of the present invention, multiple visualizations may be merged by extracting the data from each of the visualizations and representing the data in a table. Additionally, each column in the table may be a field of data and each row in the table may also be a field of data. Then, according to one implementation, the two tables may be compared to determine columns that represent the same information. If common dimensions are found, the tables may be merged and a visualization may be created to represent the tables that have been merged. This may result in fewer tables and possibly result in one table being created if the merged tables share at least one field.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java® (Java and all Java-based trademarks and logos are trademarks or registered trademarks of Oracle and/or its affiliates), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following described exemplary embodiments may provide a system, method and program product for intelligently merging visualizations.

According to at least one embodiment of the present invention, multiple visualizations may be merged by extracting the data from each of the visualizations and representing the data in a table. Multiple tables may be compared to determine columns that represent the same information. If common dimensions are found, the tables may be merged and a visualization may be created to represent the tables that have been merged, resulting in fewer tables and possibly resulting in one table being created.

According to one implementation, target visualizations (i.e., a process target) may be processed, unifying the data and producing a merged visualization. More specifically, with respect to processing a target visualization, the visual elements of the target visualization may be decoded, the data may be decoded and key visual elements may be associated with fields to create an output. As such, the output from processing the target visualization may be a collection of one or more tables that may contain the data represented in the target visualization. Each field in each table may have one or more key visual elements associated with it. Then the output from processing the target visualization may be used as input for unifying data. As such, when the data is unified, each field may be identified, the tables may be merged and a field prominence may be determined based on occurrences. Furthermore, the output from unifying the data may include a reduced set of tables that in addition to key visual element information may also have an occurrence or prominence value associated with each field. Additionally, according to one implementation when the input is a set of tables with unrelated fields, the visualizations (e.g., charts or tables) may be assembled into a single visualization which may have one visualization (e.g., chart or table) per data set.

Referring now to FIG. 1, an exemplary networked computer environment 100 in accordance with one embodiment is depicted. The networked computer environment 100 may include a computer 102 with a processor 104 and a data storage device 106 that is enabled to run a visualization merging program 108A. The networked computer environment 100 may also include a server 112 that is enabled to run a visualization merging program 108B and a communication network 110. The networked computer environment 100 may include a plurality of computers 102 and servers 112, only one of which is shown for illustrative brevity. The communication network may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 4, server computer 112 may include internal components 800a and external components 900a, respectively and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing device capable of running a program and accessing a network.

A program, such as a visualization merging program 108A and 108B may run on the client computer 102 or on the server computer 112. The visualization merging program 108A, 108B may be executed to merge multiple visualizations by extracting the data from each of the visualizations and representing the data in a table. For example, a user using a visualization merging program 108A, running on a client computer 102 may connect via a communication network 110 to server computer 112 which may also be running a visualization merging program 108B. Furthermore, the user using client computer 102 or server 112 may scan images of multiple charts or tables into the system; upload multiple chart or table images from the web; or want to merge multiple charts from within a software application. Then, the visualization merging program 108A, 108B may compare multiple tables to determine columns that represent the same information. If common dimensions are found, the tables may be merged and a visualization may be created to represent the tables that have been merged, resulting in fewer tables and possibly resulting in one table being created. The visualization merging method is explained in further detail below with respect to FIG. 3.

Figure 2:
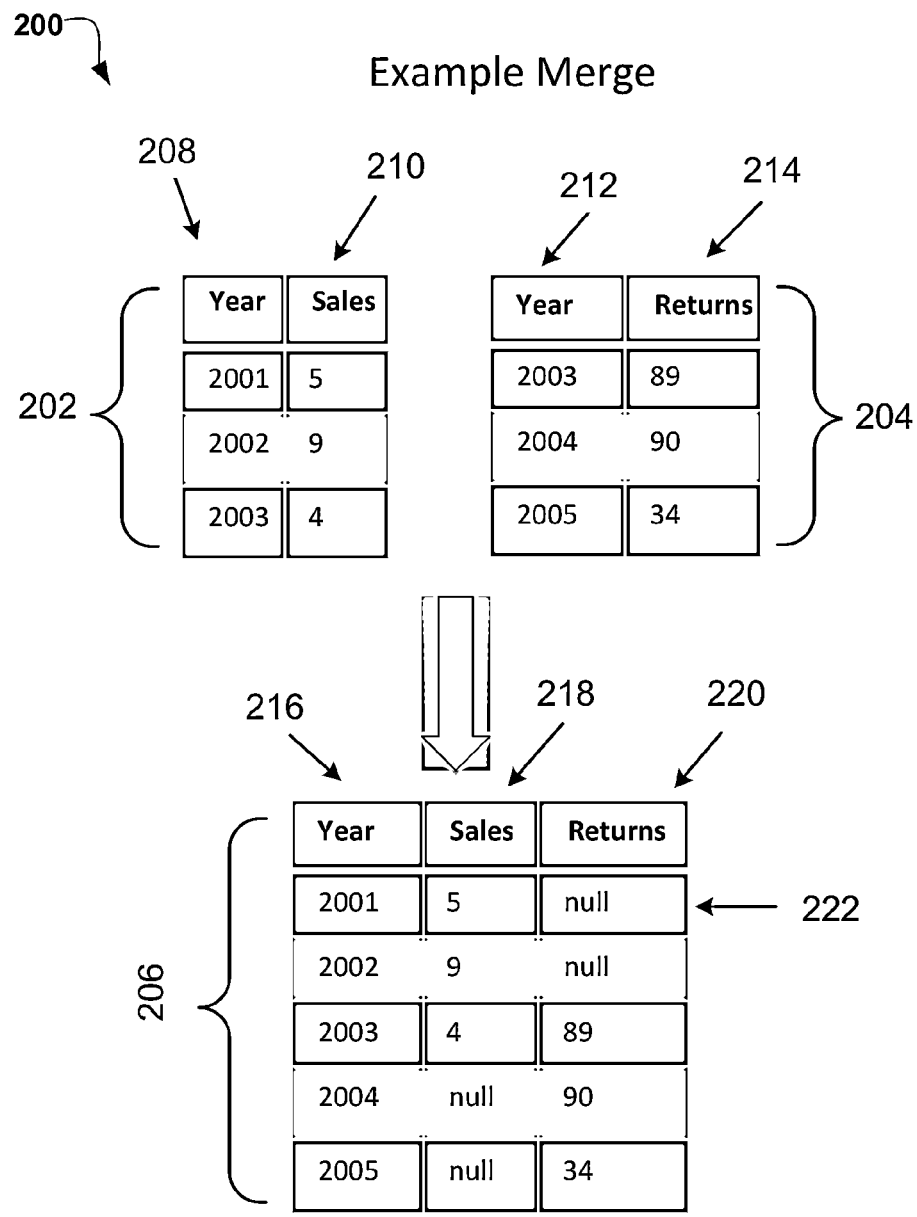
FIG. 2 illustrates an example of a visualization according to at least one embodiment.

Referring now to FIG. 2, an example of a visualization according to at least one embodiment is depicted. According to at least one implementation of the present embodiment, a user may want to combine multiple charts or tables (i.e., visualizations) 202, 204. A first table 202 may include two categories, such as the "year" 208 and "sales" 210. A second table 204 may also contain two categories, such as the "year" 212 and "returns". The visualization merging program 108A, 108B (FIG. 1) may identify the common parts of the tables 202, 204. For example, the visualization merging program 108A, 108B (FIG. 1) may identify that the category "year" 208, 212 is a common element on both table 202 and table 204. As such, according to one implementation, the visualization merging program 108A, 108B (FIG. 1) may merge the first table 202 and the second table 204 into a single visualization 206 depicting the output as a single table 206. Therefore, the single table 206 that may be depicted in the output visualization may combine the fields 208-220 (e.g., categories) from the two inputted table 202, 204 into a single table 206 representing the combined fields 208-214. For example, the fields "year" 208 and "sales" from table 202 may be combined with the fields "year" 212 and "returns" from table 204 to produce a single table 206 with the fields "year" 216, "sales" 218, and "returns" 220. Additionally, according to at least one implementation, the values for the unrelated fields may be depicted as "null" 222 in the output visualization.

The following is an example, according to at least one embodiment, of an algorithm that may be used to merge tables, such as tables 202, 204 that have at least one unrelated field (e.g., "returns" 214).

```
do
  for each (table1 in tables)
    for each (table2 in tables)
      if (at least one non-measure in table2 is found in table1)
        // copy metadata
        for each (field2 in table2 that matches a field1 in table1)
          add the occurrences or prominence of field2 to field1
          copy the key visual elements associated with field2 to field1
        // merging table2 into table1
        create a new field in table1 for each measure in table2
        create a new field in table1 for each unmatched field in table2
        for each (row in rows_of_table2)
          if (a row from table1 has the exact same values of the matching fields in table2)
            copy the values from table2 to this row of table1
          else
            create a new row in table1
            copy the values from table2 to this new row of table1
while (at least one table was merged)
```

According to embodiments of the present invention, the merging of visualizations may be implemented by collecting the visualizations to be merged. Then the data may be extracted from the each visualization and the data may be represented in a table where each column in the table is a field of data and each row in the table is a row of data. Additionally, according to one implementation, the visualization merging program 108A, 108B (FIG. 1) may compare two tables looking for columns that represent the same information. For example, in online analytical processing (OLAP) terms, the visualization merging program 108A, 108B (FIG. 1) may identify common dimensions by looking at the title of the column and analyzing the rows to identify the category, such as "years", "countries", "cities", "people", "products", etc. If common dimensions are identified, then the tables may be merged.

Additionally, according to one implementation, a tally for each field of how common it is may be recorded. For example, if a field is found to be common among 5 tables, its tally may be 5. As such, to merge the tables, the fields from the first table may be extended to include the fields in the second table that are not common. Then the visualization merging program 108A, 108B (FIG. 1) may determine which rows may be appended and which rows may be updated. Rows may be updated if the values of all common fields are the same. For example, in OLAP terms, all the members would be the same. According to one implementation, if the row can be updated, then the row values may be added for the non-common fields to the first table with the extended fields. However, if the row cannot be updated, an entirely new row may be appended to the end of the table. This may include the new values for the common fields as well as the non-common fields. The process of merging may be repeated until all tables have been merged. As such, this may result in fewer tables and possibly just one table if all tables shared at least one field. Then after the tables have been reduced or merged, the system may create a visualization to represent all the merged tables.

Figure 3:
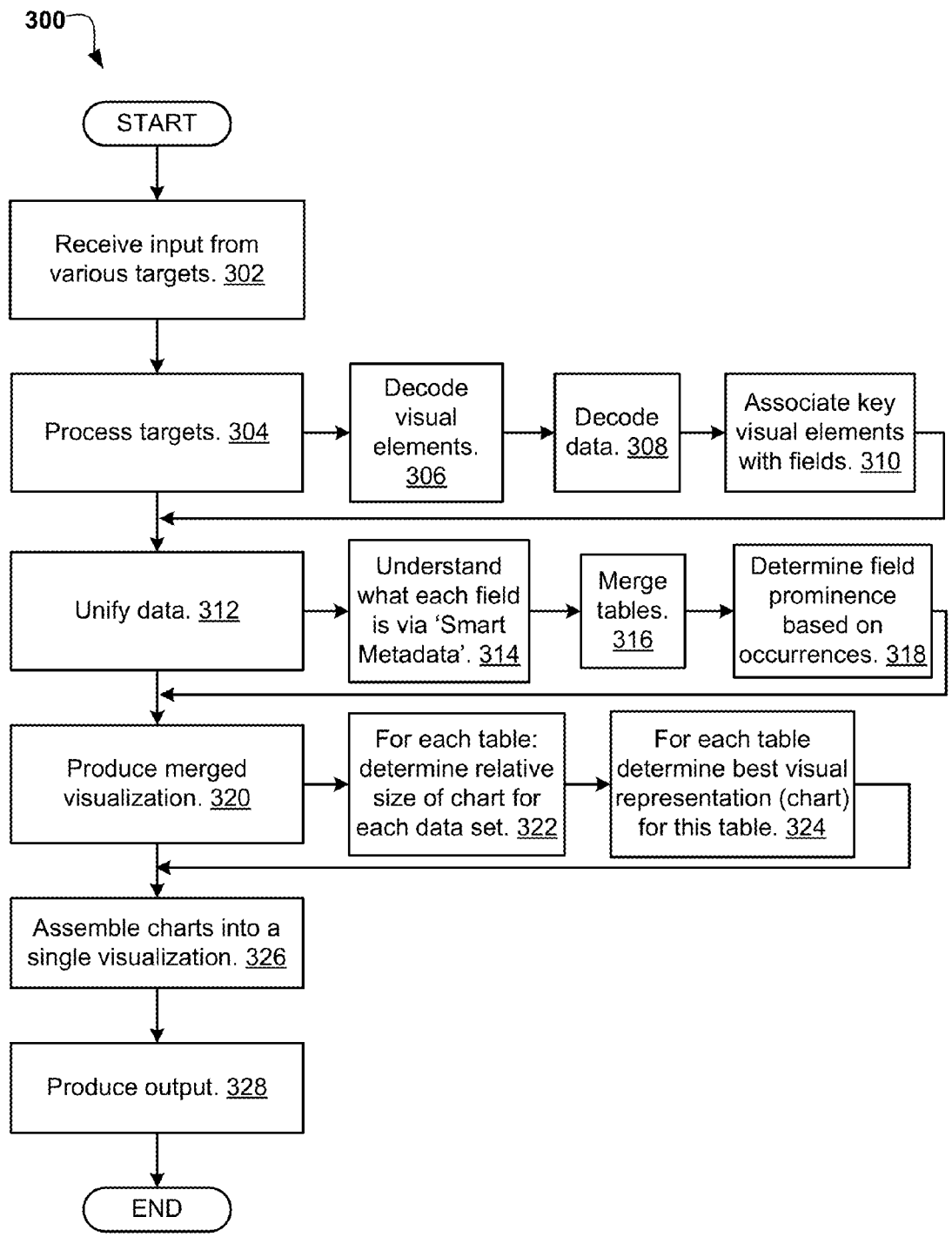
FIG. 3 is an operational flowchart illustrating the steps carried out by a program to merge visualizations according to at least one embodiment.

Referring now to FIG. 3, an operational flowchart illustrating the steps carried out by a program to merge visualizations according to at least one embodiment is depicted. For example, the visualization merging program 108A, 108B (FIG. 1) may be implemented as running on a client computer 102 (FIG. 1) or server computer 112 (FIG. 1). A user using client computer 102 (FIG. 1) or server computer 112 (FIG. 1) may, for example, scan, upload or create via a software application multiple charts or tables into the system. As such, the user using client computer 102 (FIG. 1) or server 112 (FIG. 1) may wish to merge the multiple visualizations into a newly created visualization.

As a result, according to one implementation, the created visualization may contain many charts or sub-visualizations. As such, the visualization merging program 108A, 108B (FIG. 1) may first determine the significance of each table by summing the commonality of all its fields. Then the tables may be ranked by the commonality total. Therefore, the table having the highest commonality and the most significance may be ranked first. Then for each table, the significance of each field may be determined by ranking each field by its commonality tally. As such, the fields with the highest tally may be the most significant.

Then starting with the most significant table, a sub-visualization may be determine based on the following four conditions:

1) Tables of prominent data may result in larger, more central sub-visualizations than less prominent tables. For example, if there are 3 tables, one more prominent than the others, the most prominent one may occupy the majority of the space, while the remaining two tables may be smaller and may be placed on top of the prominent table.
2) The most significant fields in the table will have the most prominence in the resulting sub-visualization. For example, if 'year' is the most prominent field in the table, 'year' may be placed on the x-axis and a line chart used while less prominent fields may only be displayed in the legend or a tooltip.
3) A knowledge base describing good visualizations for the data in the table may be used to create the final sub-visualization. For example, line charts are good for time based data; maps may be good for geospatial data, etc.
4) The original context of the source visualizations may be linked to the new visualization so that it may be obvious as to which original input visualization the data came from. For example, a tooltip with the original source chart(s) may be shown when the user hovered over the field as represented in the visualization. However, for common fields, this may show multiple source visualizations. Additionally, the relevant data may be highlighted in the source visualization(s).

Referring to FIG. 3 at 302, the visualization merging program 108A, 108B (FIG. 1) may receive input (i.e., a plurality of visualizations) from various targets. The targets (i.e., visualizations) may be received in various ways and each target may come from a different source including but not limited to scanning, selecting from a web-based source, uploading from a source, downloading from a source, pre-existing in a software application, etc. For example, a user using client computer 102 (FIG. 1) or server computer 112 (FIG. 1) may, scan, upload or create via a software application multiple visualizations (i.e., images) such as charts or tables into the system.

Next, at 304, the targets are processed (i.e. a plurality of elements within the plurality of visualizations may be analyzed). For example, a scanned image may be processed using existing image recognition technology to identify aspects of the image. Then, at 306, a plurality of visual elements associated with the plurality of elements may be decoded. For example, visual elements, such as stacked elements, targets, trend lines, etc. may be extracted. Additionally, indicators of comparison, target management, trend analysis, or outlier identification may be extracted.

Next at 308, data may be decoded. Therefore, a plurality of data fields associated with the plurality of elements may be decoded. As such, one or more tables of fields and rows which contain the data shown in the target visualization may be produced. According to one implementation, this may result in multiple tables if distinct charts are identified within the visualization. However, for a single chart, a single table may be produced. For example, with respect to FIG. 2, a table depicting the visualization "year in sales" 202 and a table depicting the visualization "year in returns" 204 may be created.

Then, at 310, key visual elements may be associated with one or more fields. As such, it may be determined if at least one visual element within the plurality of visual elements is associated with at least one data field within a plurality of data fields. The associating the plurality of key visual elements with the plurality of fields may comprise of a respecting of intent or respecting of a key visual element of a visualization within the plurality of visualizations. Therefore, each key visual element may be associated with one or more fields. For example, if the target is analyzing trends of the field "sales", then the trend may be associated with "sales". According to one embodiment of the present invention, the output of this step is a collection of one or more tables that contain the data represented in the target visualization. As such, each field in each table may have one or more key visual elements associated with it.

Next, at 312, the data may be unified. Therefore, the plurality of visualizations (i.e., data sets) may be unified to generate at least one unified visualization. The at least one unified visualization may be based on the analyzing of the plurality of elements. As such, the input for this step may be the output from the previous step 310 which may be a collection of visualizations (i.e., a collection of data sets); such as a collection of tables with associated key visual elements.

Next, based on the input of step 312, at 314, each data field may be analyzed using current technology, such as 'smart metadata'. Therefore, at least one data field within a plurality of data fields associated with the plurality of elements may be identified. As such, a determination may be made as to which fields from each data set (i.e., from each visualization within the collection of visualizations) are in fact representing the same element. With respect to FIG. 2, the element "year" 208 from table 202 may be matched with the element "year" 212 from table 204. Furthermore, according to one embodiment, 'smart metadata' technology may be utilized to intelligently determine that two elements may be matched even if the two elements are not an exact match. For example, the element "year" may be matched with the element "sales year."

Then at 316, the tables may be merged. Therefore, the plurality of visualizations may be merged into a plurality of data sets. The matching categories or dimensions may be used to merge the data tables. As such, a reduced set of visualizations (i.e., reduced to the minimum set of visualizations possible) based on the identification of common data fields between the multiple visualizations is created. For example, if there are 3 different tables of data, such as table "A" with the fields "geography" and "sales"; table "B" with the fields "year" and "sales"; and table "C" with the fields "returns" and "sales". The tables may be merged into 1 unique table, such as table "D" with fields "geography", "year", "sales" and "returns" after merging the tables with matching fields. Similarly, according to one implementation, if all the data cannot be related by common dimensions or fields, then the result may be a reduced set of multiple tables. For example, if there are 3 different tables of data, such as table "A" with the fields "geography" and "sales"; table "B" with the fields "year" and "sales"; and table "C" with the fields "returns" and "rainfall". The tables may be merged into 2 unique tables, such as table "D" with fields "geography", "year", and "sales", while table "C" may have fields "returns" and "rainfall" after merging the tables with matching fields.

Next, at 318, the field prominence may be determined based on occurrences. There for a prominence may be determined for at least one data field within a plurality of data fields associated with the plurality of elements. The field prominence for the at least one data field within the plurality of data fields may be comprised of a determination as to a number of occurrences associated with at least one data field within the plurality of data fields. For example, the prominence of a data field may be determined by counting the number of times that a field is identified. This may be performed using existing technology, such as 'smart metadata'. For example, it may be determined and recorded as to how many times a field, such as "year", "sales", or "geography" occurs on each table. As such, according to one implementation, fields that occur more often may be considered more prominent or more important. For example, fields that occur in many data sets and therefore, in may target visualizations may be considered more prominent. According to one embodiment, the output of this step may be a reduced set of tables that may have key visual element information and an occurrence or prominence value associated with each field.

Next, at 320, the merged visualization may be produced. Therefore, the plurality of elements may be unified to generate at least one unified visualization, the at least one unified visualization being based on the analyzing of the plurality of elements. As such, the input for this step may be the output from the previous step 318 which may be a set of tables with unrelated fields. According to one implementation, each field may have an occurrence or prominence of at least "1" and "0" to "N" associated with key visual elements. For example, if there are 4 tables, one more prominent than the others, the most prominent one may occupy the majority of the space on the created visualization, while the remaining three tables may be smaller and may be placed on top of the prominent table.

Then for each table, at 322, the relative size of the chart for each table set is determined. As such, a relative size for the at least one unified visualization may be determined. For example, the chart for each table may be relative to the chart's total prominence relative to the sum of the prominence of all the tables. As such, according to one implementation, this may be performed by calculating the sum of the prominence of all tables. Therefore, the tables with more prominence may be larger than the tables with less prominence.

Next, at 324, the best visual representation (e.g., chart) may be determined for each table. Therefore, the determining of the best visual representation for the assembling of the at least one unified visualization may comprise of identifying at least one key visual element associated with at least one data field within a plurality of data fields. As such, according to one implementation, this may be performed by using existing technology to determine the best representation while respecting the key visual elements associated with each field. For example, if "revenue" was in a trend, then "revenue" will remain depicted as a trend in the visualization.

Then, at 326, the charts (i.e., visualizations) may be assembled into a single visualization. As such, the at least one unified visualization may be assembled. According to one implementation, this may be performed by arranging all the charts into the smallest rectangle possible in an effort to conserve space pictorially.

Next, at 328, the output may be produced. As such, a single output visualization may be produced based on the assembling of the at least one unified visualization. For example, according to one implementation, the output may be a single visualization which may have one chart per data set (i.e., visualization).

Additionally, according to at least one implementation of the present, a processor-implemented method for merging a plurality of visualizations may comprise of the receiving the plurality of visualizations. The implementation may also include analyzing a plurality of elements within the plurality of visualizations. Further included in the implementation, may be the unifying the plurality of elements to generate at least one unified visualization, the at least one unified visualization being based on the analyzing of the plurality of elements. Additionally, the implementation may include producing a single output visualization based on the assembling of the at least one unified visualization.

Furthermore, according to at least one implementation, the analyzing of the plurality of elements may comprise of decoding a plurality of visual elements associated with the plurality of elements; decoding a plurality of data fields associated with the plurality of elements; and determining if at least one visual element within the plurality of visual elements is associated with at least one data field within the plurality of data fields. Additionally, the unifying of the plurality of visualizations may comprise of determining a prominence for at least one data field within a plurality of data fields associated with the plurality of elements. Also, the producing of the single output visualization may comprise of determining a best visual representation for the assembling of the at least one unified visualization. Furthermore, the determining the prominence for the at least one data field within the plurality of data fields may comprise of a determination as to a number of occurrences associated with the at least one data field within the plurality of data fields.

Additionally, the producing of the single output visualization may comprise of determining a relative size for the at least one unified visualization. Also, the determining the best visual representation for the assembling of the at least one unified visualization may comprise of identifying at least one key visual element associated with at least one data field within a plurality of data fields.

Figure 4:
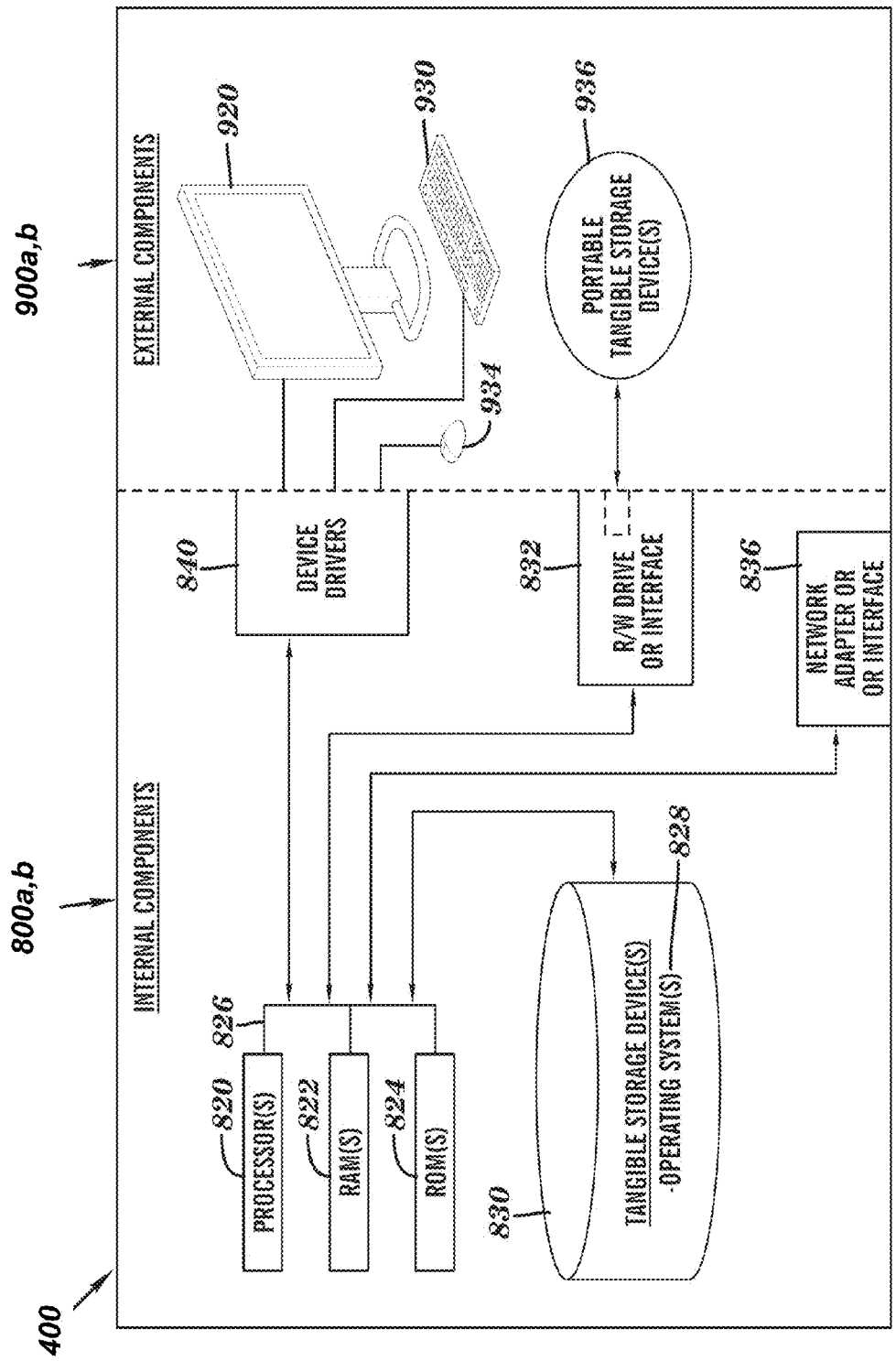
FIG. 4 is a block diagram of internal and external components of computers and servers depicted in FIG. 1 according to at least one embodiment.

FIG. 4 is a block diagram of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and visualization merging program 108A (FIG. 1) in client computer 102 and visualization merging program 108B in network server computer 112 are stored on one or more of the respective computer-readable tangible storage devices 830 for execution by one or more of the respective processors 820 via one or more of the respective RAMs 822 (which typically include cache memory). In the embodiment illustrated in FIG. 3, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as visualization merging program 108A and 108B, can be stored on one or more of the respective portable computer-readable tangible storage devices 936, read via the respective R/W drive or interface 832 and loaded into the respective hard drive 830.

Each set of internal components 800 a, b also includes network adapters or interfaces 836 such as a TCP/IP adapter cards, wireless wi-fi interface cards, or 3G or 4G wireless interface cards or other wired or wireless communication links. The visualization merging program 108A in client computer 102 and visualization merging program 108B in network server 112 can be downloaded to client computer 102 from an external computer via a network (for example, the Internet, a local area network or other, wide area network) and respective network adapters or interfaces 836. From the network adapters or interfaces 836, the visualization merging program 108A in client computer 102 and the visualization merging program 108B in network server computer 112 are loaded into the respective hard drive 830. The network may comprise copper wires, optical fibers, wireless transmission, routers, firewalls, switches, gateway computers and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for merging a plurality of visualizations, the method comprising:

receiving the plurality of visualizations;

analyzing a plurality of elements within the plurality of visualizations, wherein the analyzing of the plurality of elements comprises:

decoding a plurality of visual elements associated with the plurality of elements;

decoding a plurality of data fields associated with the plurality of elements; and determining if at least one visual element within the plurality of visual elements is associated with at least one data field within the plurality of data fields;

unifying the plurality of elements to generate at least one unified visualization, the at least one unified visualization being based on the analyzing of the plurality of elements; and producing a single output visualization based on the assembling of the at least one unified visualization.

2. The method of claim 1, wherein the unifying of the plurality of visualizations comprises determining a prominence for at least one data field within a plurality of data fields associated with the plurality of elements.

3. The method of claim 1, wherein the producing the single output visualization comprises determining a best visual representation for the assembling of the at least one unified visualization.

4. The method of claim 2, wherein the determining the prominence for the at least one data field within the plurality of data fields comprises a determination as to a number of occurrences associated with the at least one data field within the plurality of data fields.

5. The method of claim 1, wherein the producing the single output visualization comprises determining a relative size for the at least one unified visualization.

6. The method of claim 3, wherein determining the best visual representation for the assembling of the at least one unified visualization comprises identifying at least one key visual element associated with at least one data field within a plurality of data fields.

7. A computer system for merging a plurality of visualizations, the computer system comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

receiving the plurality of visualizations;

analyzing a plurality of elements within the plurality of visualizations, wherein the analyzing of the plurality of elements comprises:

decoding a plurality of visual elements associated with the plurality of elements;

decoding a plurality of data fields associated with the plurality of elements; and determining if at least one visual element within the plurality of visual elements is associated with at least one data field within the plurality of data fields;

unifying the plurality of elements to generate at least one unified visualization, the at least one unified visualization being based on the analyzing of the plurality of elements; and producing a single output visualization based on the assembling of the at least one unified visualization.

8. The computer system of claim 7, wherein the unifying of the plurality of visualizations comprises determining a prominence for at least one data field within a plurality of data fields associated with the plurality of elements.

9. The computer system of claim 7, wherein the producing the single output visualization comprises determining a best visual representation for the assembling of the at least one unified visualization.

10. The computer system of claim 8, wherein the determining the prominence for the at least one data field within the plurality of data fields comprises a determination as to a number of occurrences associated with the at least one data field within the plurality of data fields.

11. The computer system of claim 7, wherein the producing the single output visualization comprises determining a relative size for the at least one unified visualization.

12. The computer system of claim 9, wherein determining the best visual representation for the assembling of the at least one unified visualization comprises identifying at least one key visual element associated with at least one data field within a plurality of data fields.

13. A computer program product for merging a plurality of visualizations, the computer program product comprising:

one or more computer-readable storage devices and program instructions stored on at least one of the one or more tangible storage devices, the program instructions executable by a processor, the program instructions comprising:

program instructions to receive the plurality of visualizations;

program instructions to analyze a plurality of elements within the plurality of visualizations, wherein the analyzing of the plurality of elements comprises:

program instructions to decode a plurality of visual elements associated with the plurality of elements;

program instructions to decode a plurality of data fields associated with the plurality of elements; and program instructions to determine if at least one visual element within the plurality of visual elements is associated with at least one data field within the plurality of data fields;

program instructions to unify the plurality of elements to generate at least one unified visualization, the at least one unified visualization being based on the analyzing of the plurality of elements; and program instructions to produce a single output visualization based on the assembling of the at least one unified visualization.

14. The computer program product of claim 13, wherein the unifying of the plurality of visualizations comprises determining a prominence for at least one data field within a plurality of data fields associated with the plurality of elements.

15. The computer program product of claim 13, wherein the producing the single output visualization comprises determining a best visual representation for the assembling of the at least one unified visualization.

16. The computer program product of claim 14, wherein the determining the prominence for the at least one data field within the plurality of data fields comprises a determination as to a number of occurrences associated with the at least one data field within the plurality of data fields.

17. The computer program product of claim 13, wherein the producing the single output visualization comprises determining a relative size for the at least one unified visualization.

* * * * *